(12) United States Patent
Chen et al.

(10) Patent No.: US 11,995,982 B2
(45) Date of Patent: May 28, 2024

(54) METHOD FOR CONSTRUCTING PREDICTION MODEL OF AUTO TRIPS QUANTITY AND PREDICTION METHOD AND SYSTEM

(71) Applicant: CHANG AN UNIVERSITY, Xi'an (CN)

(72) Inventors: Zhe Chen, Xi'an (CN); Bin Zhao, Xi'an (CN); Yuehan Wang, Xi'an (CN); Zongtao Duan, Xi'an (CN); Na Fan, Xi'an (CN); Jun Kang, Xi'an (CN)

(73) Assignee: CHANG AN UNIVERSITY, Xi'an (CN)

( * ) Notice: Subject to any disclaimer, the term of this patent is extended or adjusted under 35 U.S.C. 154(b) by 396 days.

(21) Appl. No.: 17/433,242

(22) PCT Filed: Dec. 10, 2020

(86) PCT No.: PCT/CN2020/135078
§ 371 (c)(1),
(2) Date: Aug. 24, 2021

(87) PCT Pub. No.: WO2021/212866
PCT Pub. Date: Oct. 28, 2021

(65) Prior Publication Data
US 2022/0343756 A1 Oct. 27, 2022

(30) Foreign Application Priority Data
Apr. 21, 2020 (CN) .......................... 202010317209.6

(51) Int. Cl.
*G08G 1/01* (2006.01)
(52) U.S. Cl.
CPC ......... *G08G 1/0125* (2013.01); *G08G 1/0104* (2013.01)

(58) Field of Classification Search
CPC .... G08G 1/0125; G08G 1/0104; G06N 3/044; G06N 3/045; G06N 3/08; G06Q 10/04; G06Q 50/26
See application file for complete search history.

(56) References Cited

U.S. PATENT DOCUMENTS 8,755,991 B2 * 6/2014 Wynter ............. G01C 21/3691
340/995.13
10,810,484 B2 * 10/2020 Xie ....................... G06F 7/5443
(Continued)

OTHER PUBLICATIONS

Physica A501 (2018) 227-237; Title "Modeling the heterogeneous traffic correlations in urban road systems using traffic-enhanced community detection" by Feng Lu (Year: 2018).*

*Primary Examiner* — Sohana Tanju Khayer
(74) *Attorney, Agent, or Firm* — Bayramoglu Law Offices LLC

(57) ABSTRACT

A method for constructing a prediction model of an auto trips quantity and a prediction method and system are disclosed. The prediction model construction method designs a deep neural network Multitask GCN-LSTM based on GCN and LSTM for predicting the auto trips quantity. The deep neural network comprises three modules, wherein the three modules are respectively used for extracting a spatial correlation, a temporal correlation and a feature fusion. The prediction method and system predict the auto trips quantity based on a model constructed. By considering a road segment local relationship and a road segment global relationship and taking an auto arrival quantity as a related task in constructing the model, the prediction model construction method uses a multi-task learning method to avoid overfitting of the deep neural network and reduce a prediction error of the auto trips quantity effectively.

5 Claims, 1 Drawing Sheet

(56) References Cited

U.S. PATENT DOCUMENTS

| | | | | |
|---|---|---|---|---|
| 10,810,486 B2* | 10/2020 | Dong | ............... | G06Q 30/0202 |
| 2016/0202074 A1* | 7/2016 | Woodard | ............ | G06Q 10/047 |
| | | | | 701/465 |
| 2018/0126271 A1* | 5/2018 | Katzir | ................... | H04W 4/33 |
| 2019/0156662 A1* | 5/2019 | Zhong | ................ | G08G 1/0141 |
| 2019/0180612 A1* | 6/2019 | Demiryurek | ......... | G08G 1/0116 |
| 2020/0019585 A1* | 1/2020 | Balu | ................... | G06F 16/287 |
| 2020/0132476 A1* | 4/2020 | Roeth | .............. | G01C 21/3822 |
| 2022/0215749 A1* | 7/2022 | Laraki | ............. | G01C 21/3492 |
| 2022/0316900 A1* | 10/2022 | Farooq | ............ | G01C 21/3691 |
| 2023/0186647 A1* | 6/2023 | Mahata | ................ | G06V 10/26 |
| | | | | 382/103 |

* cited by examiner

US 11,995,982 B2

METHOD FOR CONSTRUCTING PREDICTION MODEL OF AUTO TRIPS QUANTITY AND PREDICTION METHOD AND SYSTEM

CROSS REFERENCE TO THE RELATED APPLICATIONS

This application is the national stage entry of international Application No. PCT/CN2020/135078, filed on Dec. 10, 2020, which is based upon and claims priority to Chinese Patent Application No. 202010317209.6 filed on Apr. 21, 2020, the entire contents of which are incorporated herein by reference.

TECHNICAL FIELD

The present disclosure relates to the technologies of predicting vehicle traffic flows, in particular to a method for constructing a prediction model of an auto trips quantity and a prediction method and system for an OD (Origin-Destination) flow of vehicles.

BACKGROUND

The traffic prediction task is critical in an intelligent traffic system. An object of the traffic prediction task is to predict a corresponding traffic state in a certain time period in the future on a road network according to a historical time period traffic data sequence (for example, a traffic flow, a vehicle speed and the like) and realistic road network data. In the traffic prediction task, it is in particular important to predict the auto trips quantity accurately and efficiently, which is one of the most challenging tasks. Achievement of accurate and efficient prediction of auto trips quantity contributes to selecting reasonable trips routes by travelers and conducting scientific urban planning and public vehicle scheduling of resources by an urban management department, thereby alleviating the problem of traffic jam and reducing the waste of public resources.

The existing auto trips prediction methods usually include dividing an urban area spatially into several grids and predicting the trips quantity in the grid areas. This method is coarse in prediction accuracy in space and cannot predict the trips quantity in a road section level.

SUMMARY

To address defects and shortcomings in the prior art, the present disclosure provides a method for constructing a prediction model of an auto trips quantity.

Thus, the method for constructing a prediction model of an auto trips quantity provided by the present disclosure includes:

(1) extracting an adjacency relationship among road segments in a target area road network to generate a road segment relationship adjacency matrix, wherein any one element of the road segment relationship adjacency matrix is $A_{(i,j)}^R$, $A_{(i,j)}^R$ represents adjacency relationship between the road segment i and the road segment j, and if the road segment i and the road segment j are connected directly, $A_{(i,j)}^R=1$, and otherwise, $A_{(i,j)}^R$ is zero; the size of the road segment relationship adjacency matrix is M*M, any one column represents the adjacency relationship between the road segment represented by the current column and other road segments, any one row represents the adjacency relationship between the road segment represented by the current row and other road segments, both the road segment i and the road segment j are any road segment in the target area road network, and M is a total numbers of the road segments in a target area;

(2) cleaning and calibrating vehicle trajectory data obtained within the target area during a reasonable time range, resulting in the pre-processed data, wherein the reasonable time range at least comprises N time slots and N is a natural number greater than or equal to 10;

(3) constructing an auto trips quantity matrix and an auto arrival quantity matrix from the $n^{th}$ time slot to the $(n+K)^{th}$ time slot of the pre-processed data;

wherein any one element in the auto trips quantity matrix is $x(n+k,j)$, $x(n+k,j)$ is the auto trips quantity generated on the road segment j in the $(n+k)^{th}$ time slot, the size of the auto trips quantity matrix is (K+1) row*M column, any one column vector is a trips quantity sequence of the road segment represented by the current column and any one row vector is a trips quantity sequence of the time slot represented by the current row;

any one element in the auto arrival quantity matrix is $y(n+k,j)$, $y(n+k,j)$ is the auto arrival quantity generated on the road segment) in the $(n+k)^{th}$ time slot, the size of the auto arrival quantity matrix is (K+1) row*M column, any one column vector is an arrival quantity sequence of the road segment represented by the current column and any one row vector is an arrival quantity sequence of the time slot represented by the current row;

extracting an auto trips quantity vector and an auto arrival quantity vector of the pre-processed data in the $(n+K+1)^{th}$ time slot, wherein any one element in the auto trips quantity vector is $x(n+K+1, j)$, and $x(n+K+1, j)$ is the auto trips quantity generated on the road segment j in the $(n+K+1)^{th}$ time slot;

any one element in the auto arrival quantity vector is $y(n+K+1, j)$, $y(n+K+1, j)$ is the auto arrival quantity generated on the road segment j in the $(n+K+1)^{th}$ time slot;

n is equal to 1, 2, . . . , (N−K−1), and n is initialized as 1;

k is equal to 1, 2, 3, . . . K, and K is a natural number greater than or equal to 7;

(4) calculating a similarity between any two road segment trips quantity sequences from the $n^{th}$ time slot to the $(n+K)^{th}$ time slot and a similarity between the arrival quantity sequences to obtain a trips quantity similarity weight matrix and an arrival quantity similarity weight matrix, wherein any one element in the trips quantity similarity weight matrix is $A_{(i,j)}^x$, and $A_{(i,j)}^x$ is a similarity between the trips quantity sequences of the road segment i and the road segment j; the size of the trips quantity similarity weight matrix is M*M, any one row represents the trips quantity similarity among the road segment represented by the row, the road segment itself and other road segments, and any one column represents the trips quantity similarity among the road segment represented by the column, the road segment itself and other road segments;

any one element in the arrival quantity similarity weight matrix is $A_{(i,j)}^y$, and $A_{(i,j)}^y$ is a similarity between the arrival quantity sequences of the road segment i and the road segment j; the size of the trips quantity similarity weight matrix is M*M, any one row represents the trips quantity similarity among the road segment represented by the row, the road segment itself and other road segments, and any one column represents the trips quantity similarity among the road segment represented by the column, the road segment itself and other road segments;

the column vectors of all the above matrixes correspond to each other, and the column vector at a same sequence position corresponds to a same road segment;

(5) constructing a trips local relationship graph, a trips global relationship graph, an arrival quantity local relationship graph and an arrival quantity global relationship graph;

a characteristic matrix of the trips local relationship graph is an auto trips quantity matrix constructed in the step (3) and the adjacency matrix is a road segment relationship adjacency matrix based on a physical road network constructed in the step (1);

a characteristic matrix of the trips global relationship graph is an auto trips quantity matrix constructed in the step (3) and the adjacency matrix is a trips quantity similarity weight matrix constructed in the step (4);

a characteristic matrix of the arrival quantity local relationship graph is an autoarrival quantity matrix constructed in the step (3) and the adjacency matrix is a road segment relationship adjacency matrix based on a physical road network constructed in the step (1);

a characteristic matrix of the trips global relationship graph is an auto arrival quantity matrix constructed in the step (3) and the adjacency matrix is an arrival quantity similarity weight matrix constructed in the step (4);

(6) training or updating the prediction model by taking the trips quantity local relationship graph, the trips quantity global relationship graph, the arrival quantity local relationship graph and the arrival quantity global relationship graph constructed in the step (5), and taking the trips quantity vector and the arrival quantity vector of the $(n+K+1)^{th}$ time slot as tags, wherein the prediction model is initialized as the MTGL neural network;

(7) set n=n+1, executing the steps (3)-(6); and (8) circularly executing the step (7) till n=N−K−1 to obtain the prediction model.

Optionally, in step (4), the similarity between trips quantity sequences and the similarity between arrival quantity sequences of any two road segment from the $n^{th}$ time slot to the $(n+K)^{th}$ time slot are calculated by adopting a Pearson's correlation coefficient, a Spearman correlation coefficient or a cosine similarity.

On the other hand, the present disclosure further provides a method for predicting an auto trips quantity. The method for predicting an auto trips quantity provided includes:

step I, constructing an auto trips quantity matrix and an auto arrival quantity matrix from the $(N−K)^{th}$ time slot to the $N^{th}$ time slot;

step II, calculating similarities among the trips quantity sequences and similarities among the arrival quantity sequences for each road segment from the $(N−K)^{th}$ time slot to the $N^{th}$ time slot to obtain a trips quantity similarity weight matrix and an arrival quantity similarity weight matrix;

step III, constructing a trips local relationship graph, a trips global relationship graph, an arrival quantity local relationship graph and an arrival quantity global relationship graph;

a characteristic matrix of the trips local relationship graph is an auto trips quantity matrix constructed in the step I, and the adjacency matrix is a road segment relationship adjacency matrix based on a physical road network constructed in the step (1);

the characteristic matrix of the trips quantity global relationship graph is the auto trips quantity matrix constructed in the Step I and the adjacency matrix is the trips quantity similarity weight matrix constructed in the Step II;

the characteristic matrix of the arrival quantity local relationship graph is the auto arrival quantity matrix constructed in the Step I and the adjacency matrix is the road segment relationship adjacency matrix based on the physical road network constructed in the step (1) in claim 1;

the characteristic matrix of the trips quantity global relationship graph is the auto arrival quantity matrix constructed in the Step I and the adjacency matrix is the arrival quantity similarity weight matrix constructed in the step II; and step IV, inputting the trips quantity local relationship graph, the trips quantity global relationship graph, the arrival quantity local relationship graph and the arrival quantity global relationship graph constructed in the step IV in the model constructed in the above method to output the trips quantity vector and the arrival quantity vector in the $(N+1)^{th}$ time slot in a to-be-predicted time quantum.

Optionally, the reasonable time quantum is at least one week.

Optionally, a unit of the time slot is minute or hour.

Meanwhile, the present disclosure further provides a system for predicting an auto trips quantity. Thus, the system provided by the present disclosure includes a data acquisition and pre-processing module, a model updating module and a result prediction module, wherein the data acquisition and pre-processing module is used for executing the step (1) to step (5), and an obtained result is transmitted to the model updating module; and the data acquisition and pre-processing module is further used for executing the step I to step III, and an obtained result is transmitted to the result prediction module;

the model updating module is used for executing the step (6), step (7) and step (8) to output the prediction model; and The result prediction module is used for executing the step IV to output the prediction result.

Compared with the prior art, the present disclosure has the following beneficial effects:

1. By considering a road segment local relationship and a road segment global relationship simultaneously, a trips quantity local relationship graph and a trips quantity global relationship graph are constructed, and a new auto trips quantity prediction network Multitask GCN-LSTM (MTGL) is designed based on GCN and LSTM, and the space granularity for prediction can be corrected to road segment.

2. The method provided by the present disclosure considers correlation between the auto trips quantity and the arrival quantity. By taking prediction of the auto arrival quantity as a related task, the method improves the accuracy of predicting the trips quantity in an auxiliary manner by adopting a multi-task learning strategy, such that the method has the advantage of being more accurate in prediction result. The method provided by the present disclosure is in particular suitable for predicting the trips quantities of taxis and on-line hailing cars in urban road segments, which has important application value in the intelligent traffic system.

The time granularity of prediction is ensured elaborate by data and length of the time slot in a reasonable time range.

DETAILED DESCRIPTION OF THE EMBODIMENTS

Figure 1:
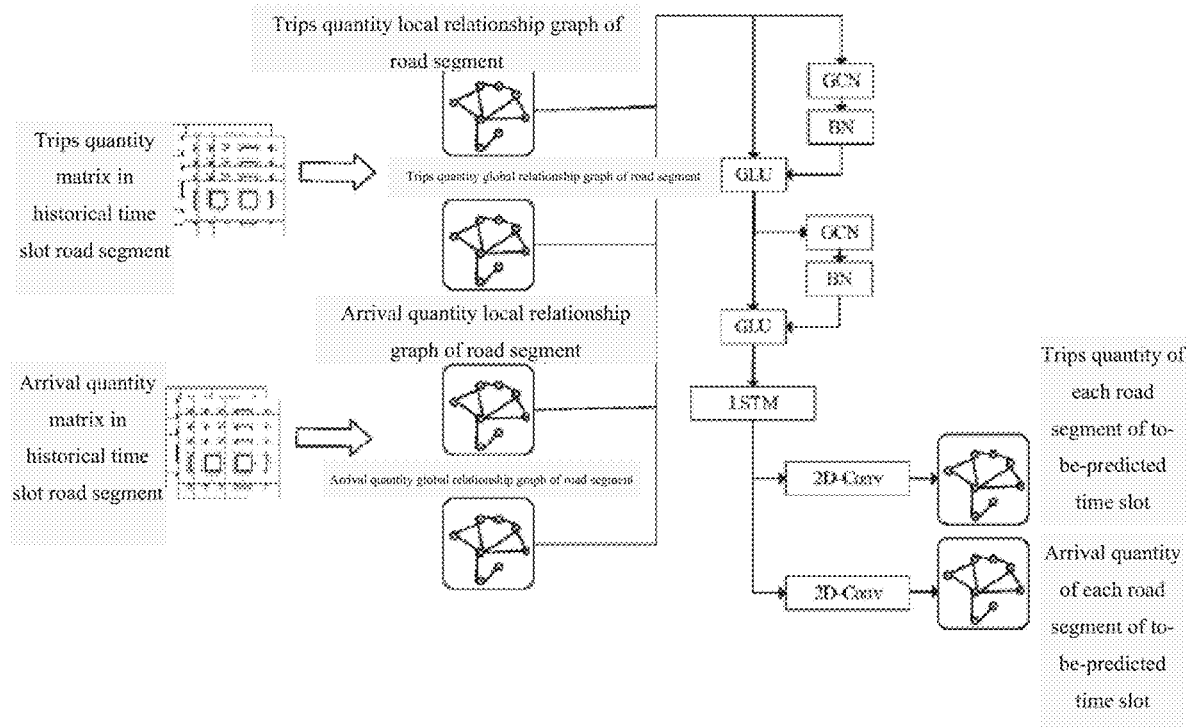
FIG. 1 is a framework diagram of the mixed deep network model in the present disclosure.

Acquisition of the vehicle trajectory data and data content in the method provided by the present disclosure are known to those skilled in the art, and the acquired data content at least includes license plate numbers, GPS sampling times, GPS geographic positions, carrying states and the like. Data composition and acquisition related to a road network relationship in the target area (for example, a certain city) is also known, and the data content at least includes road segment numbers and GPS geographic positions. The vehicle trajectory data acquired in the present disclosure is the vehicle trajectory data aiming at the target area, for example, a city and a region, and is data within a certain time range. The time range meets the requirement of data size of the prediction method, for example, a week, half a month, a month, a year and the like.

The vehicle trajectory data is cleaned and calibrated in the present disclosure, wherein the purpose of cleaning data is to remove invalid data, format error and abnormal data and data without change in GPS geographic position within a certain time quantum and data absent from the target area to obtain qualified data. The purpose of calibration is to conduct map matching on the data so as to calibrate errors of the GPS data. Means for cleaning and calibrating data are known to those skilled in the art.

Acquisition of trips quantity information of the present disclosure is conducted on the road segment. If a get-on point of an automobile is located in the road segment i, a trips event happens in the road segment i, and similarly, if a get-off point of the automobile is located in the road segment i, an arrival event happens in the road segment i, and specifically, the get-on points and the get-off points can be extracted by the get-on event and get-off event detecting algorithm to record the trips event or the arrival event. The trips quantity in the time slot of the road segment is a total number of times of the trips events, and the arrival quantity is a total number of times of the arrival events.

The trips quantity is counted for each road segment i according to a proper time slot, such that the trips quantity of each time slot is extracted. The trips quantity is matriculated to obtain an original trips quantity matrix. Specifically, the matriculated rule of the trips quantity is that any row of vectors represents an auto trips quantity of each road segment in the current time slot. Counting of the arrival quantity and the matriculated rule are consistent with the trips quantity.

In the matrixing process of the data, the size of the time slot can be determined flexibly according to a to-be-predicted time range, for example, the primary prediction time range is a time slot, and if the time slot is 5 minutes, data of one week is fed to train, and primary prediction can predict the trips quantity information within one time slot (5 minutes) in the future. Trips quantity information prediction in the follow-up time slot (5 minutes) may be conducted on the trips quantity information in the current prediction time slot (5 minutes) and the historical time slot (the time range of the used trips quantity information is a continuous time of two hours). Relatively, the shorter the time slot is, the higher the accuracy of prediction is. If the time slot is prolonged, the accuracy of prediction is reduced, and the sizes of the time slots with the reasonable accuracy are within the range of the present disclosure, for example, several minutes, several hours and the like.

In a specific example, if the total time slot number of the used data is N, the time slot number of the used training sample at a single time is K+1, and from the first time slot, the trips quantity vector and the arrival quantity vector of the next time slot are taken as tags by using the data of the (K+1) time slot as a training sample. For example, data from the first time slot to the $K^{th}$ time slot is taken as the training sample, and the trips quantity vector and the arrival quantity vector of the $(K+1)^{th}$ time slot are taken as tags; data from the second time slot to the $(K+1)^{th}$ time slot is taken as the training sample, and the trips quantity vector and the arrival quantity vector of the $(K+2)^{th}$ time slot are taken as tags; by parity of reasoning, all training data is used to complete model training.

In a specific embodiment, the similarity between any two road segment trips quantity sequences from the $(N-k)^{th}$ time slot to the $(N-1)^{th}$ time slot and the similarity between the arrival quantity sequences are calculated by adopting common time sequence similarity calculating methods such as a Pearson's correlation coefficient, a Spearman correlation coefficient or a cosine similarity. A specific example is as shown in a formula (1), $$A^x_{(i,j)} = \begin{cases} e^{-\frac{L^2_{(i,j)}}{\sigma^2}}, & i \neq j \text{ and } e^{-\frac{L^2_{(i,j)}}{\sigma^2}} \geq \varepsilon \\ 0, & \text{otherwise} \end{cases} \quad (1)$$

Wherein $\sigma^2$ and $\varepsilon$ are used for controlling distribution and sparseness of the adjacency matrix. If the value of $\sigma^2$ is fixed, the greater the a is, the sparser the matrix is; and if the value of $\varepsilon$ is fixed, the smaller the $\sigma^2$ is, the sparser the matrix is. Here, $\varepsilon$ is set to 0.5, $\sigma^2$ is set to 1000, thereby preventing the matrix from being too sparse.

L(i,j) is a distance between the trips quantity sequences of the road segment i and the road segment j (or the distance between the arrival quantity sequences of the road segment i and the road segment j), and the distance is calculated by using a DTW algorithm, wherein $\varepsilon$ and $\sigma^2$ are empirical values. In a specific example, $\varepsilon$ is 0.5 and $\sigma^2$ is selected from 10, 100 and 1000.

A structure diagram of the deep neural network Multi-task GCN-LSTM (MTGL neural network) adopted in the present disclosure is as shown in the FIG. 1. The network primarily includes three portions: a spatial characteristic (local spatial characteristic and a global spatial characteristic) extraction module, a temporal characteristic extraction module and a characteristic fusion module. The spatial characteristic extraction module is achieved by using two layers of GCN+GLU. By processing the local relationship graph of the road segment, the trips quantity relationship and the arrival quantity relationship between adjacent road segments can be extracted effectively, i.e., the local spatial characteristic; and by processing the global relationship graph of the road segment, the trips quantity relationship and the arrival quantity relationship between remote road segments can be extracted effectively, i.e., the global spatial characteristic.

The temporal characteristic extraction module is achieved by using an LSTM network which can acquire long-term time dependence effectively. The characteristic fusion module is achieved by using a two-dimensional convolution, and a prediction result obtained based on the local relationship graph of the road segment and a prediction result obtained based on the global relationship graph of the road segment are fused to obtain a final prediction result of the auto trips quantity of the road segment.

In terms of functional principle, the MTGL neural network adopted by the present disclosure is composed of four channels, and each channel is composed of two layers of GCN+GLU, multiple LSTM layers and a Conv2D layer in sequence, wherein each channel inputs the trips local relationship graph, the trips global relationship graph, the arrival quantity local relationship graph and the arrival quantity global relationship graph. Prior to the Conv2D layer, each channel sequentially outputs the trips quantity matrix of the to-be-predicted time slot by only considering the local relationship, the trips quantity matrix of the to-be-predicted time slot by only considering the global relationship, the arrival quantity matrix of the to-be-predicted time slot by only considering the local relationship and the arrival quantity matrix of the to-be-predicted time slot by only considering the global relationship. The Conv2D layer fuses the two trips quantity matrixes and the two arrival quantity matrixes output by the previous layer to obtain a final prediction result.

Further detailed description on the present disclosure will be made below in combination with specific embodiments, which is illustrative rather than limitative to the present disclosure.

Example 1

Data of the embodiment is originated from true vehicle trajectory data in Xi' an city, including over 10000 vehicles, covering all areas within the third ring of Xi' an city, wherein the total road segment number is greater than 20000. Each vehicle is provided with a GPS data acquisition device which conducts data acquisition once every 30 seconds, wherein the acquired fields include vehicle information, acquisition time, longitude and latitude, available or not and the like.

In the embodiment, the vehicle trajectory data from 17th, Oct. 2016 to 23rd, Oct. 2016 is used, totally 7 days. Data of 6 days is taken as a training set and data of one day is taken as a test set.

In the embodiment, the a trips quantity and arrival quantity within a time slot of every 5 minutes for each road segment to generate the trips quantity matrix and the arrival quantity matrix, and construct the trips local relationship graph, the trips global relationship graph, the arrival quantity local relationship graph and the arrival quantity global relationship graph for network training. In the embodiment, an initial value of a learning rate is set as 0.0001, K is equal to 7, from the first time slot, training is conducted by using eight time slots as the training samples every time, for example, the $(1-8)^{th}$ time slots and the $9^{th}$ time slot, and the $(2-9)^{th}$ time slot and the $10^{th}$ time slot are trained till data of one week is used to complete training, thereby obtaining the prediction model.

In the embodiment, all parameters in the model are as follows: a number of iteration is set as 500 times, an attenuation parameter is 0.9, a batch size is set as 32, and an early termination policy is employed to prevent overfitting of the network. Performance of the model is analyzed by taking root-mean-square error (RMSE) and mean absolute error (MAE) as evaluation indexes.

Meanwhile, performance comparison is made on HA (historical average), ARIMA (Autoregressive Integrated Moving Average), MLP (Multilayer Perceptron), SVR (support vector regression), LSTM (Long Short Term Memory) and GCN (Graph convolutional neural network) and the Multi-task GCN-LSTM (MTGL) model of the present disclosure.

Input shape: (24, 851), output shape (1, 851), the number of iteration: 500, training samples: 6 days, and test samples: 1 day, and an error result is a mean value in predicting each time slot error.

In the embodiment, a trips quantity prediction comparison experimental result is as shown in a table 1:

TABLE 1

| Method | RMSE | MAE |
| --- | --- | --- |
| HA | 1.0126 | 0.6924 |
| ARIMA | 1.2746 | 1.1289 |
| MEP | 1.1837 | 0.7228 |
| SVR | 1.0088 | 0.6916 |
| LSTM | 1.0048 | 0.6831 |
| GCX | 0.9879 | 0.6769 |
| MTGL (the present disclosure) | 0.9535 | 0.6481 |

Example 2

Figure 2:
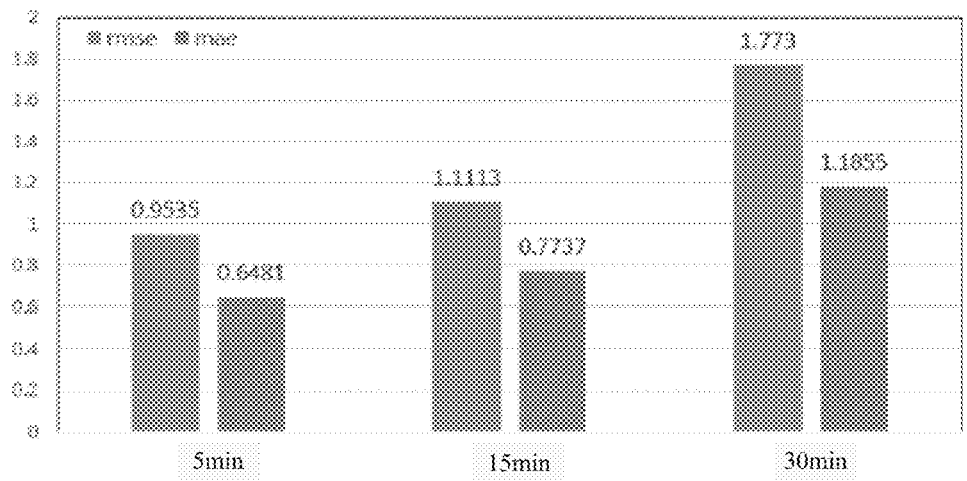
FIG. 2 is an experimental result diagram of influence comparison by the length of the time slot on prediction performance in the embodiment 2.

In order to further verify the stability of the algorithm, based on the scheme of the embodiment 1, data sets are constructed by taking the time slots of 5 min, 15 min and 30 min respectively, and prediction is conducted respectively by means of the method in the present disclosure to calculate a prediction error. A comparison experimental result on influence of prediction performance by lengths of different time slots is as shown in table 2, and a visual diagram is the FIG. 2:

TABLE 2

| Length of time slot | RMSE | MAE |
| --- | --- | --- |
| 5 min | 0.9535 | 0.6481 |
| 15 min | 1.1113 | 0.7737 |
| 30 min | 1.773 | 1.1855 |

Result Analysis

It can be seen from the embodiment 1, the prediction error of the model of the present disclosure is smaller than that of other models, and the prediction performance is superior to that of an existing prediction model.

Comparative Example

Referring to the following table 3, the scheme of the embodiment is different from the method in the embodiment.

The Single-Task GCN (Global) method merely uses the similarity relationship between the road segment trips quantity sequences to construct a diagram, that is, the global relationship of the road segment is considered without predicting the arrival quantity by means of the multi-task learning policy. The network structure is composed of two layers of GCN, and the obtained RMSE and MAE are respectively 0.9879 and 0.6869.

A GLU unit is added into the Single-Task GCN+GLU (Global).

The Multi-Task GCN+GLU (Global) method considers correlation between the trips quantity and the arrival quantity, and uses the multi-task learning to improve the prediction accuracy, such that it can be seen that arrival quantity prediction as an auxiliary task can reduce the prediction error for predicting the trips quantity effectively, thereby improving the accuracy of predicting the trips quantity.

The time characteristic extraction model is added into the Multi-Task GCN+GLU+LSTM (Global) method, and compared with the above-mentioned method, the descending amplitude of prediction error is increased, which reflects importance of fully extracting time characteristic to prediction.

The Multi-Task GCN+GLU+LSTM (Local) method only uses a connecting relationship among the road segments in an original road network to construct the graph to predict the trips quantity.

The prediction network MTGL neural network of the present disclosure considers all the factors to obtain the minimum prediction error.

TABLE 3

| Method | RMSE | MAE |
|---|---|---|
| Single-Task GCN (Global) | 0.9879 | 0.6869 |
| Single-Task GCN + GLU (Global) | 0.9842 | 0.6836 |
| Multi-Task GCN + GLU (Global) | 0.9774 | 0.6781 |
| Multi-Task GCN + GLU-LSTM (Global) | 0.9556 | 0.6688 |
| Multi-Task GCN + GLU-LSTM (Local) | 0.9544 | 0.6643 |
| MTGL (the present disclosure) | 0.9535 | 0.6481 |

The invention claimed is:

1. A method for constructing a prediction model of an auto trips quantity, comprising steps of:

(1) extracting an adjacency relationship among road segments in a target area road network to generate a road segment relationship adjacency matrix, wherein any one element of the road segment relationship adjacency matrix is $A_{(i,j)}^R$, $A_{(i,j)}^R$ denotes an adjacency relationship between a road segment i and a road segment j, and when the road segment i and the road segment j are connected directly, $A_{(i,j)}^R=1$, and when the road segment i and the road segment j are connected indirectly, $A_{(i,j)}^R$ is zero; a size of the road segment relationship adjacency matrix is M*M, any one column represents the adjacency relationship between a road segment represented by a current column and other road segments, any one row represents the adjacency relationship between a road segment represented by a current row and the other road segments, both the road segment i and the road segment j are any road segment in the target area road network, and M is a total number of the road segments in the target area;

(2) cleaning and calibrating vehicle trajectory data within a time range of the target area to obtain pre-processed data, wherein the time range at least comprises N time slots and N is a natural number greater than or equal to 10;

(3) constructing an auto trips quantity matrix and an auto arrival quantity matrix of the pre-processed data from an $n^{th}$ time slot to an $(n+K)^{th}$ time slot, wherein any one element in the auto trips quantity matrix is x(n+k,j), x(n+k,j) is an auto trips quantity generated on the road segment j in the $(n+k)^{th}$ time slot, a size of the auto trips quantity matrix is (K+1) row*M column, any one column vector is a trips quantity sequence of the road segment represented by the current column and any one row vector is a trips quantity sequence of a time slot represented by the current row;

any one element in the auto arrival quantity matrix is y(n+k,j), y(n+k,j) is an auto arrival quantity generated on the road segment j in the $(n+k)^{th}$ time slot, a size of the auto arrival quantity matrix is the (K+1) row*M column, any one column vector is an arrival quantity sequence of the road segment represented by the current column and any one row vector is an arrival quantity sequence of the time slot represented by the current row;

extracting an auto trips quantity vector and an auto arrival quantity vector of the pre-processed data in an $(n+K+1)^{th}$ time slot, wherein any one element in the auto trips quantity vector is x(n+K+1, j), and x(n+K+1, j) is an auto trips quantity generated on the road segment j in the $(n+K+1)^{th}$ time slot;

any one element in the auto arrival quantity vector is y(n+K+1, j), y(n+K+1,j) is an auto arrival quantity generated on the road segment j in the $(n+K+1)^{th}$ time slot;

n is equal to 1, 2, . . . , (N−K−1), and n is initialized as 1;

k is equal to 1, 2, 3, . . . K, and K is a natural number greater than or equal to 7;

(4) calculating a similarity between any two road segment trips quantity sequences from the $n^{th}$ time slot to the $(n+K)^{th}$ time slot and a similarity between arrival quantity sequences to obtain a trips quantity similarity weight matrix and an arrival quantity similarity weight matrix, wherein any one element in the trips quantity similarity weight matrix is $A_{(i,j)}^x$, and $A_{(i,j)}^x$ denotes a similarity between the any two road segment trips quantity sequences of the road segment i and the road segment j; a size of the trips quantity similarity weight matrix is M*M, any one row represents a trips quantity similarity among the road segment represented by the current row, the road segment and the other road segments, and any one column represents the trips quantity similarity among the road segment represented by the current column, the road segment and the other road segments;

any one element in the arrival quantity similarity weight matrix is $A_{(i,j)}^y$, and $A_{(i,j)}^y$ is a similarity between the arrival quantity sequences of the road segment i and the road segment j; the size of the trips quantity similarity weight matrix is M*M, the any one row represents the trips quantity similarity among the road segment represented by the current row, the road segment and the other road segments, and the any one column represents the trips quantity similarity among the road segment represented by the current column, the road segment and the other road segments;

column vectors of above matrixes correspond to each other, and a column vector at a same sequence position corresponds to a same road segment;

(5) constructing a trips quantity local relationship graph, a trips quantity global relationship graph, an arrival quantity local relationship graph and an arrival quantity global relationship graph;

a characteristic matrix of the trips quantity local relationship graph is the auto trips quantity matrix constructed in the step (3) and an adjacency matrix of the trips quantity local relationship graph is the road segment relationship adjacency matrix based on a physical road network constructed in the step (1);

a characteristic matrix of the trips quantity global relationship graph is the auto trips quantity matrix constructed in the step (3) and an adjacency matrix of the trips quantity global relationship graph is the trips quantity similarity weight matrix constructed in the step (4);

a characteristic matrix of the arrival quantity local relationship graph is an auto arrival quantity matrix constructed in the step (3) and an adjacency matrix of the arrival quantity local relationship graph is the road segment relationship adjacency matrix based on a physical road network constructed in the step (1);

a characteristic matrix of the arrival quantity global relationship graph is the auto arrival quantity matrix constructed in the step (3) and an adjacency matrix of the arrival quantity global relationship graph is the arrival quantity similarity weight matrix constructed in the step (4);

(6) training or updating the prediction model by taking the trips quantity local relationship graph, the trips quantity global relationship graph, the arrival quantity local relationship graph and the arrival quantity global relationship graph constructed in the step (5), and taking the auto trips quantity vector and the auto arrival quantity vector of the $(n+K+1)^{th}$ time slot as tags, wherein the prediction model is initialized as a Multi-task GCN-LSTM (MTGL) neural network;

(7) setting n=n+1, and executing the steps (3)-(6); and (8) circularly executing the step (7) till n=N−K−1 to obtain a finalized prediction model.

2. The method according to claim 1, wherein for any two road segment, the similarity between the any two road segment trips quantity sequences from the $n^{th}$ time slot to the $(n+K)^{th}$ time slot and the similarity between the arrival quantity sequences in the step (4) are calculated by adopting a Pearson's correlation coefficient, a Spearman correlation coefficient or a cosine similarity.

3. A method for predicting an auto trips quantity, comprising:

step I, constructing an auto trips quantity matrix and an auto arrival quantity matrix from an $(N-K)^{th}$ time slot to an $N^{th}$ time slot;

step II, calculating similarities among road segment trips quantity sequences from the $(N-K)^{th}$ time slot to the $N^{th}$ time slot and similarities among arrival quantity sequences to obtain a trips quantity similarity weight matrix and an arrival quantity similarity weight matrix;

step III, constructing a trips local relationship graph, a trips global relationship graph, an arrival quantity local relationship graph and an arrival quantity global relationship graph;

a characteristic matrix of a trips quantity local relationship graph is the auto trips quantity matrix constructed in the step I and an adjacency matrix of the trips quantity local relationship graph is a road segment relationship adjacency matrix constructed by extracting an adjacency relationship among road segments in a target area road network based on a physical road network;

a characteristic matrix of a trips quantity global relationship graph is the auto trips quantity matrix constructed in the Step I, and an adjacency matrix of the trips quantity global relationship graph is the trips quantity similarity weight matrix constructed in the Step II;

a characteristic matrix of an arrival quantity local relationship graph is the auto arrival quantity matrix constructed in the Step I and an adjacency matrix of the arrival quantity local relationship graph is the road segment relationship adjacency matrix based on the physical road network;

a characteristic matrix of an arrival quantity global relationship graph is the auto arrival quantity matrix constructed in the step I and an adjacency matrix of an arrival quantity global relationship graph is the arrival quantity similarity weight matrix constructed in the step II; and step IV, inputting the trips quantity local relationship graph, the trips quantity global relationship graph, the arrival quantity local relationship graph and the arrival quantity global relationship graph constructed in the step IV in the finalized prediction model of claim 1 to output the auto trips quantity vector and the auto arrival quantity vector in the $(N+1)^{th}$ time slot in a to-be-predicted time quantum.

4. The method according to claim 2, wherein a time quantum of the time range is at least one week.

5. The method according to claim 2, wherein a unit of each of the N time slots is a minute or an hour.

* * * * *